United States Patent
Chiou et al.

(10) Patent No.: US 8,744,431 B2
(45) Date of Patent: Jun. 3, 2014

(54) APPARATUS AND METHOD FOR NETWORK BASED WIRELESS NETWORK TEST

(76) Inventors: Ta-Gang Chiou, Taipei (TW); Chao-Chi Chang, Taipei (TW)

( * ) Notice: Subject to any disclaimer, the term of this patent is extended or adjusted under 35 U.S.C. 154(b) by 0 days.

(21) Appl. No.: 13/307,288

(22) Filed: Nov. 30, 2011

(65) Prior Publication Data
US 2012/0142335 A1    Jun. 7, 2012

Related U.S. Application Data

(60) Provisional application No. 61/458,778, filed on Dec. 2, 2010.

(51) Int. Cl.
*H04W 24/00*    (2009.01)
(52) U.S. Cl.
USPC ............... 455/423; 455/67.11; 455/456.1
(58) Field of Classification Search
USPC ................................ 455/423, 67.11, 456.1
See application file for complete search history.

(56) References Cited

U.S. PATENT DOCUMENTS

| | | | | |
|---|---|---|---|---|
| 2003/0174789 A1* | 9/2003 | Waschura et al. | | 375/340 |
| 2004/0236676 A1* | 11/2004 | Takezawa et al. | | 705/38 |
| 2007/0293215 A1* | 12/2007 | Dawson | | 455/433 |
| 2008/0132244 A1* | 6/2008 | Anderson | | 455/456.1 |
| 2009/0129342 A1* | 5/2009 | Hwang et al. | | 370/331 |
| 2009/0318089 A1* | 12/2009 | Stratford et al. | | 455/67.11 |
| 2010/0197239 A1* | 8/2010 | Catovic et al. | | 455/67.11 |

* cited by examiner

*Primary Examiner* — Qun Shen

(57) ABSTRACT

A method and an apparatus for network based wireless network test which allows wireless network operators to reduce the manpower and resource used in traditional drive test task by utilizing existing data in the network and the trend that more and more mobile devices can provide precise location and mobile applications/services are requesting location related information near users or reporting user location information. By associating the right event logs data extracted from control plane with location information extracted from user plane, this method can generate drive test like results with highly accurate geographical information and correspondent wireless signal measurements. Furthermore, this method is applicable to all generation of the wireless network as long as the necessary data are available.

16 Claims, 2 Drawing Sheets

APPARATUS AND METHOD FOR NETWORK BASED WIRELESS NETWORK TEST

BACKGROUND OF INVENTION

1. Field of the Invention

The invention is related to a method that can apply to different generation of mobile networks for testing the mobile networks, and more particularly to a method which utilizes the event logs data extracted from control plane with location information extracted from user plane in order to generate drive test like results with highly accurate geographical information and correspondent wireless signal measurements for mobile networks.

2. Description of the Prior Art

For wireless networks such as mobile networks and so on, drive test is the conventional method wireless network operators use to verify whether the wireless network operates as what they expect or not after any network deployment and modification, including adding and removing sites or adjusting sites' configuration. The traditional drive test equipment includes a cell phone, a laptop, and a GPS. During the conventional drive test trip, the drive test equipment usually collects information includes radio performance—such as signal strength and noise ratio—as well as some signaling information by making test phone calls. Meanwhile, the GPS unit in the drive test equipment collects location information associated to call activities. In this case, the engineers can learn how the mobile network performs with high geographical accuracy along the routes or locations drive test trips are conducted from the data traditional drive test equipments collected. One important advantage traditional drive test method provides is the highly accurate geographical information associated with call activities conducted by drive test equipment. However, the drawback of traditional drive test method is that it takes a huge amount of manpower and can only apply to certain routes or locations because of the manpower constraints. In recent years, a new kind of methods, called geolocation, is proposed to replace the drive test because this new kind of methods can monitor the whole mobile network instead of only certain routes or locations. This kind of methods utilize event logs or call trace logs, i.e. the logs of messages exchanged between devices and wireless network to maintain the connection and service, to locate where users (e.g., mobile devices) made calls, then associated call activities can be linked with those determined locations. However, the biggest challenge of this method is the accuracy of user positioning results, which usually falls into 100~200 meter error ranges because that's the best this kind of methods can achieve due to the information constraint in event logs or call trace logs. This level of accuracy may not be sufficient for engineers to conduct detailed analysis of their mobile network, and thus leaves a room for further improvements.

SUMMARY OF THE INVENTION

Accordingly, it is an objective of the present invention to provide an apparatus and a method for network based wireless network test, which combines the advantages and removes the drawbacks of conventional drive test and geolocation, that is, the apparatus and method in accordance with the present invention can provide the whole wireless network's performance with high geographical accuracy.

In order to achieve aforementioned objective, the present invention discloses an apparatus and a method for network based wireless network test. The apparatus is connected to a wireless network system that comprises a wireless network capable of providing communication services to a plurality of mobile devices. The apparatus comprises:

a control plane data retriever for retrieving control plane data, the control plane data including a plurality of radio performance information regarding to radio performances of connections when at least some of the mobile devices connect to the wireless network;

a user plane data retriever for retrieving user plane data; the user plane data including a plurality of location related information regarding to locations of at least some of the mobile devices when these mobile devices connect to the wireless network;

a control plane data parser for parsing the control plane data in order to obtain the radio performance information from the control plane data;

a user plane data parser for parsing the user plane data in order to obtain the location related information from the user plane data, the location related information including a plurality of valid location related information;

a parsed data validate and merger for at least merging the radio performance information with the location related information in such a manner that each of the valid location related information is paired with a correspondent radio performance information that is regarding to the same mobile device; and a results generator for generating merged results that comprise at least the paired radio performance information and valid location related information. The results generator generates the merged results in a form alike conventional drive test results.

In a preferred embodiment, the user plane data are the data that mobile devices transmit to retrieve location related information; the user plane data are retrieved from at least one of the following: network elements and probes.

In a preferred embodiment, the mobile device transmits to retrieve location related information under one of the following circumstances: i) the mobile device transmits a latitudinal and longitudinal information obtained by using a GPS module built-in the mobile device to the wireless network in order to retrieve location related information according to the latitudinal and longitudinal information; ii) the mobile device transmits a request to the wireless network in order to retrieve the location related information according to a current location of that mobile device; and iii) the mobile device connects to a nearby WiFi station by using a WiFi module built-in the mobile device and transmits the WiFi station's location related information to the wireless network, wherein the location related information of that mobile device is associated with the WiFi station's location related information.

In a preferred embodiment, the control plane data are logs of messages exchanged between mobile devices and wireless network to maintain the connection and service; the logs of messages are obtained from either event logs or call trace logs; the control plane data are retrieved from at least one of the following: network elements and probes.

In a preferred embodiment, the parsed data validate and merger further validates the parsed control plane data and the parsed user plane data in order to check whether the parsed control plane data have correspondent parsed user plane data and vice versa.

In a preferred embodiment, the parsed data validate and merger further checks whether the obtained location related information is within a right area by comparing whether the obtained location related information falls within the area served by the network elements or probes which the wireless network test apparatus retrieved the user plane data from; wherein, if the result of comparison is "YES", then the obtained location related information is the valid location related information; if the result of comparison is "NO", then the obtained location related information is discarded.

In a preferred embodiment, the parsed data validate and merger pairs the valid location related information with a corresponding radio performance information based on a session information and a time information; the session information is used to pair the user plane data with correspondent control plane data, and the time information is used to pair the valid location related information with corresponding radio performance information.

In a preferred embodiment, the time information is used to pair the valid location related information with corresponding radio performance information by applying a fuzzy temporal scan; the fuzzy temporal scan comprises the following procedures:

determining a first time T1 when is the time that the valid location related information is captured by either the network elements or probes; and scanning the radio performance information to see if any radio performance information is found within a time interval ranged between (T1−Tt) to (T1+Tt) while Tt is a defined threshold; if one radio performance information is found within the time interval, then the found radio performance information is associated with the valid location information; if more than one radio performance information are found within the time interval, then the radio performance information with a found time closest to the first time T1 is associated with the valid location information; if no radio performance information is found within the time interval, then the valid location information is discarded.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
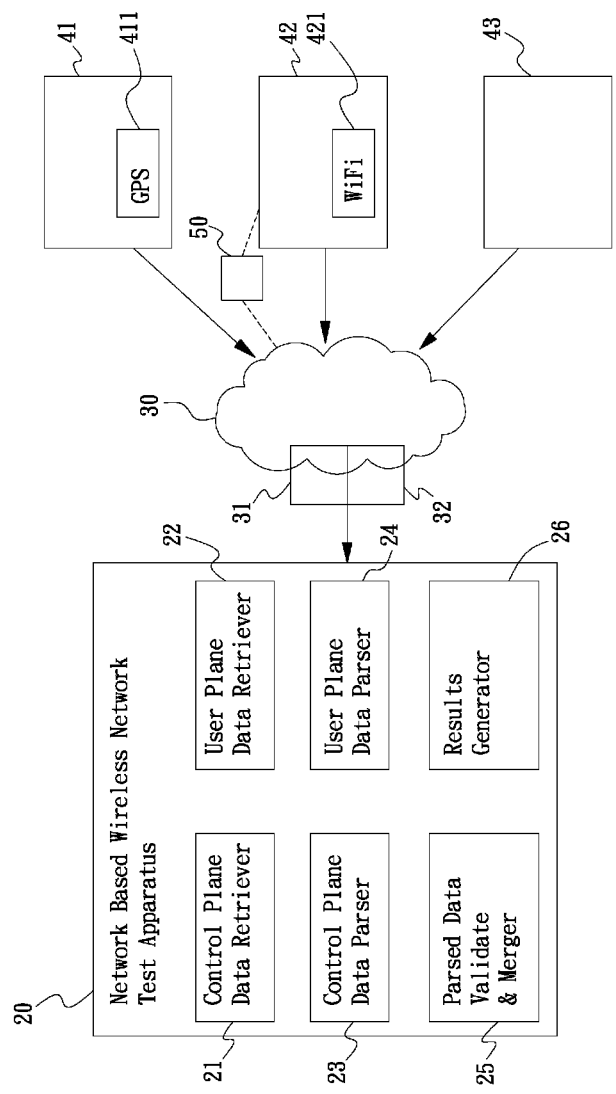
FIG. 1 shows a component diagram of a preferred embodiment of the apparatus for network based wireless network test in accordance with the present invention.

The present invention provides an apparatus and a method for network based wireless network test, which combines the advantages and removes the drawbacks of conventional drive test and geolocation, that is, the apparatus and method in accordance with the present invention can provide the whole wireless network's performance with high geographical accuracy, without the need to actually conduct the conventional drive test.

The method and apparatus of the present invention can apply to different generation of mobile network, including GSM/GPRS/EDGE, CDMA2000/EVDO, UMTS/HSPA, WiMax, LTE, LTE-A, and so on. The mobile devices can be any kind of handset devices utilizing mobile network, such as mobile phone, iPad, data card, PDA, blackberry, or other devices that can access to the mobile network.

More and more modern mobile devices come with built-in GPS modules, which can provide very accurate device locations with error range within 5 meters. Also, many mobile devices, equipped with built-in WiFi modules for providing WiFi capability, can transmit sensed Wifi network information to network servers to determine fairly accurate device locations with error range within 20 meters. Services and applications running on these mobile devices can utilize locations provided by GPS modules or WiFi based methodologies to retrieve user interested location related information—such as map data, point of interests, etc., via mobile network (also referred as wireless network hereinafter). The method of the present invention utilizes this market and technology trend to realize the network based wireless network test.

The method of the present invention utilizes two kinds of data to realize the network based wireless network test. The first kind of data is the same data as those data used in the conventional geolocation based methods, i.e. event logs or call trace logs, and this kind of data are usually known as control plane data. These control plane data are available on many modern network elements, such as RNC in UMTS or eNodeB in LTE, with slightly different formats based on vendors' implementations. For example, Ericsson named this kind of control plane data as General Protocol Error Handling (GPEH) while Huawei named them as Call History Record (CHR). Some other names in different vendors or technologies include PSMM, Issue Logs, etc. Also, this kind of control plane data can also be captured by "probe" which can be either a hardware or an RNC software capable of monitoring or probing activities of mobile devices. Therefore, probe can be another kind of data source of the control plane data in addition to abovementioned ones. In event logs/call trace logs, we can extract the radio performance information—including signal strength of sensed station and signal noise ratio, etc.—as well as signaling information that are also collected by the traditional drive test equipments. The second kind of data used in the method of the present invention is called user plane data, which are the data users want to transmit and receive. The method of the present invention does not use all user plane data but mainly utilizes user plane data carrying location related information, which users' mobile devices transmit to retrieve location related information users are interested in as abovementioned. The figure shown in the URL-link "http://maps.google.com/maps/api/staticmap-?center=40.718217,−73.9982848(zoom=148(size=512× 5128(maptype=roadmap&sensor=false" is an example of the user plane data the method of the present invention is interested in. The example, typically a figure of map, shown in the above URL-link is a typical location related information request users' mobile device sent out to retrieve location related information—map data in this case—around the users' current location and the users' location information is carrying in the form of latitude and longitude.

User plane data can be captured in a similar way as control plane data, such as via network elements or probes.

FIG. 1 shows a component diagram of a preferred embodiment of the apparatus 20 for network based wireless network test in accordance with the present invention. The components shown in FIG. 1 are typically software components in this preferred embodiment; however, these components can also be hardware components such like integrated circuitry (IC) components or electronic circuitries having the ICs capable of providing the functions described below. The apparatus 20 for network based wireless network test in accordance with the present invention is usually constituted by one or several computation processors to execute the various software components, and memory and storage space to store the intermediate and final outputs. In a preferred embodiment of the present invention, this apparatus 20 is connected to a wireless network system that comprises a wireless network 30 capable of providing communication services to a plurality of mobile devices 41, 42, 43, and comprises a Control Plane Data Retriever 21, a User Plane Data Retriever 22, a Control Plane Data Parser 23, a User Plane Data Parser 24, a Parsed Data Validate & Merger 25, and a Results Generator 26.

The Control Plane Data Retriever 21 and User Plane Data Retriever 22 are in charge of communicating with network elements 31 or probes 32 to retrieve necessary data for further processing. In this embodiment, the Control Plane Data Retriever 21 retrieves control plane data from the network elements 31 or probes 32. The control plane data includes a plurality of radio performance information regarding to radio performances of connections, such like but not limited to signal strength and noise ratio, when at least some of the mobile devices 41, 42, 43 connect to the wireless network 30. The User Plane Data Retriever 22 retrieves user plane data from the network elements 31 or probes 32. The user plane data includes a plurality of location related information regarding to locations of at least some of the mobile devices 41, 42, 43 when these mobile devices 41, 42, 43 connect to the wireless network 30 for transmitting and/or receiving data via the wireless network 30. The control plane data are logs of messages exchanged between mobile devices 41, 42, 43 and wireless network 30 to maintain the connection and service. The logs of messages are obtained from either event logs or call trace logs in this embodiment. The user plane data are the data that mobile devices 41, 42, 43 transmit to retrieve location related information. In a preferred embodiment, such location related information is transmitted to retrieve by the mobile device 41, 42, 43 under one of the following circumstances:

i) the mobile device 41 transmits a latitudinal and longitudinal information obtained by using a GPS module 411 built-in the mobile device 41 to the wireless network 30 in order to retrieve location related information, such like map data around the current location of mobile device 41, according to the latitudinal and longitudinal information;

ii) the mobile device 43 transmits a request to the wireless network 30 in order to retrieve the location related information according to a current location of that mobile device 43; for example, the mobile device 43 sends a request to the wireless network 30 to ask for the latitudinal and longitudinal information of that mobile device 30 by means of 3G-positioning technologies; and iii) the mobile device 42 connects to a nearby WiFi station 50 by using a WiFi module 421 built-in the mobile device 42 and transmits the WiFi station's 50 location related information, such as IP address and MAC ID, to the wireless network 30; such IP address and MAC ID can then be used to trace the geographical location of the WiFi station 50; and thereby, the location related information of that mobile device 42 is associated with the WiFi station's 50 location related information.

The Control Plane Data Parser 23 and User Plane Data Parser 24 are in charge of parsing necessary control plane data and user plane data, such as measurement reports containing the cell signal strength and noise measurements and location related information, retrieved by data retrievers 21, 22. In this embodiment, the Control Plane Data Parser 23 parses the control plane data in order to obtain the radio performance information, such as cell signal strength and noise measurements, from the control plane data. The User Plane Data Parser 24 parses the user plane data in order to obtain the location related information from the user plane data, wherein, the location related information includes a plurality of valid location related information.

The Parsed Data Validate & Merger 25 merges the control and user plane parsed data considering the time, session (the control and user plane data need to belong to the same data communication session), etc. In this embodiment, the Parsed Data Validate & Merger 25 merges the radio performance information with the location related information in such a manner that each of the valid location related information is paired with a correspondent radio performance information that is regarding to the same data communication session of the same mobile device. In addition to data merging, the Parsed Data Validate & Merger 25 further validates the parsed control plane data and the parsed user plane data in order to check whether the parsed control plane data have correspondent parsed user plane data and vice versa.

In a preferred embodiment, the Parsed Data Validate & Merger 25 performs the validation process by checking whether the obtained location related information is within a right area by comparing whether the obtained location related information falls within the area served by the network elements 31 or probes 32 which the wireless network test apparatus 20 retrieved the user plane data from. If the result of comparison is "YES", then the obtained location related information is the valid location related information; if the result of comparison is "NO", then the obtained location related information is invalid and thus discarded.

Preferably, the Parsed Data Validate & Merger 25 pairs the valid location related information with a corresponding radio performance information based on a session information and a time information. The session information is used to pair the user plane data with correspondent control plane data, and the time information is used to pair the valid location related information with corresponding radio performance information. Particularly, the time information is used to pair the valid location related information with corresponding radio performance information by applying a fuzzy temporal scan. The fuzzy temporal scan comprises the following procedures:

a) determining a first time T1 when is the time that the valid location related information is captured by either the network elements 31 or probes 32; and b) scanning the radio performance information to see if any radio performance information is found within a time interval ranged between (T1−Tt) to (T1+Tt) while Tt is a defined threshold; if one radio performance information is found within the time interval, then the found radio performance information is associated with the valid location information; if more than one radio performance information are found within the time interval, then the radio performance information with a found time closest to the first time T1 is associated with the valid location information; if no radio performance information is found within the time interval, then the valid location information is discarded.

The Results Generator 26 takes the merged data and output the results followed the common or user defined drive test format. In this embodiment, the Results Generator 26 generates merged results that comprise at least the paired radio performance information and valid location related information in a form alike conventional drive test results.

Figure 2:
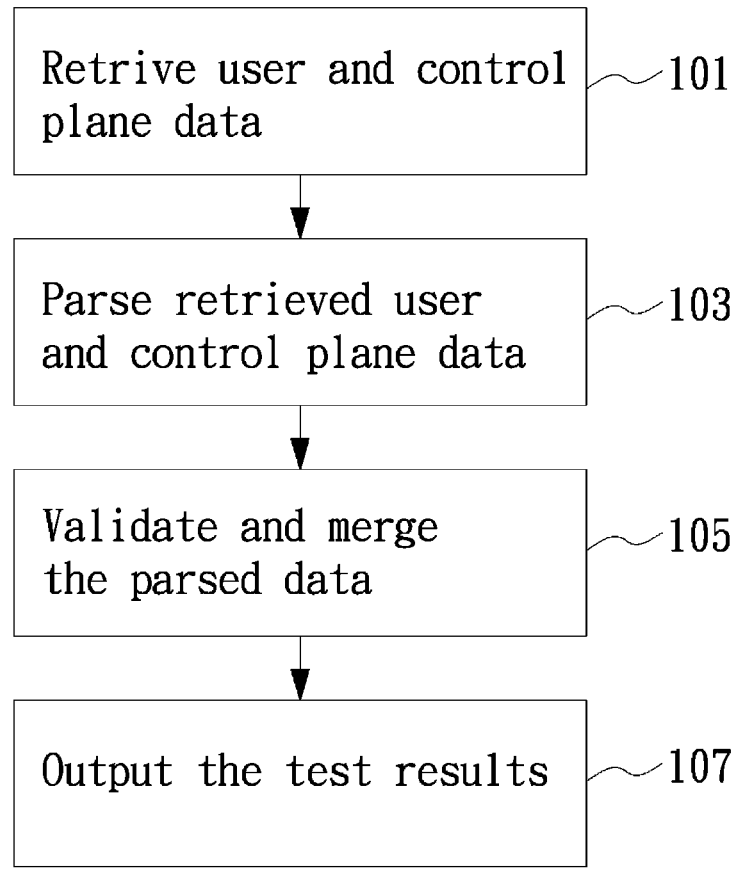
FIG. 2 shows a flow chart of a preferred embodiment of the method for network based wireless network test in accordance with the present invention.

FIG. 2 illustrates the steps about how the method of the present invention works. Step 101 is to retrieve the user plane data and control plane data from network elements or probes and it can be automatic or manual depending on the needs. The original data retrieved can be in the forms of file or database. The data can also be retrieved via application programming interface (API) if network elements or probes supported. Step 103 is to parse the retrieved data to extract necessary data. The necessary data include the measurement reports from control plane data and the location related information—usually is latitude/longitude carrying in the request—from user plane data, as well as some common information such as time, session information for later on process. Step 105 is to validate the parsed data then merge the validated data. The validation includes checking whether the parsed control plane data have correspondent parsed user plane data and vice versa. Advanced validation includes checking whether the captured user location is within the right area since some mobile applications/services allow users to retrieve information not around them. This checking is achieved by comparing whether the captured user location falls within the area served by the network elements or probes we retrieved data from. The merge step is to pair the correspondent parsed control plane data and user plane data based on the session information and time information. The session information is used to pair the user plane data and control plane data. The time information is used to pair the measurement report details with the location related information since these two kinds of data may not be captured by the network elements or probes at the exact same time. Therefore, some fuzzy temporal scan is needed to pair the measurement reports and the location related information. For example, if parsed location related information is captured by the network elements or probes at time T1, it needs to scan whether any measurement reports fall into the time range (T1−Tt) to (T1+Tt) while Tt is a defined threshold. If one measurement report is found within the time interval, then the found measurement report can be associated with the location related information. If more than one measurement reports are found, then the closest one time-wise is associated. After this step, there should be many paired (measurement reports, location related information) data entries with time information for step 107. Step 107 is to generate the drive-test-like format data based on the intermediate results from step 105 while the users can define the area and time constraints to generate the drive-test-like results.

The primary concept of the apparatus and method for network based wireless network test in accordance with the present invention is to combine the advantages and removes the drawbacks of conventional drive test and geolocation. That is, the apparatus and the method of the present invention acquire radio performance information contained in the control plane data that can be obtained from event logs (or call trace logs) by using a way similar to the conventional geolocation method. However, in stead of using the event logs (or call trace logs) to determine the locations of mobile devices as the conventional geolocation method does, the apparatus and the method of the present invention acquire location related information from user plane data which are the data that mobile devices transmit to retrieve location related information, which is quite different from the methods of conventional drive test and geolocation. It is due to the trend that more and more mobile devices can provide precise location and mobile applications/services are requesting location related information near users or reporting user location information. Since both the control plane data and user plane data are existing data in the wireless network, thus manpower and resource used are significantly reduced in comparison with the conventional drive test. In addition, because the user plane data are the data that mobile devices transmit to retrieve location related information, the location related information acquired by the apparatus and the method of the present invention is more accurate and precise than which obtained by using the conventional geolocation method. By associating the right event logs data extracted from control plane data with location related information extracted from user plane data, the apparatus and the method of the present invention can generate drive test like results with highly accurate geographical information and correspondent wireless signal measurements. Furthermore, this apparatus/method is applicable to all generation of the wireless network as long as the necessary data are available.

While the present invention has been particularly shown and described with reference to a preferred embodiment, it will be understood by those skilled in the art that various changes in form and detail may be without departing from the spirit and scope of the present invention.

What is claimed is:

1. A method for network based wireless network test, which is implemented in a wireless network system that comprises a wireless network capable of providing communication services to a plurality of mobile devices, said method comprising:

step (A): using a wireless network test apparatus to retrieve control plane data and user plane data; the control plane data including a plurality of radio performance information regarding to radio performances of connections when at least some of the mobile devices connect to the wireless network; the user plane data including a plurality of location related information regarding to locations of at least some of the mobile devices when these mobile devices connect to the wireless network;

step (B): the wireless network test apparatus parsing the control plane data and the user plane data in order to obtain the radio performance information from the control plane data and to obtain the location related information from the user plane data, said location related information including a plurality of valid location related information;

step (C): the wireless network test apparatus merging the radio performance information with the location related information in such a manner that each of the valid location related information is paired with a corresponding radio performance information that is regarding to the same mobile device; and step (D): the wireless network test apparatus generating merged results that comprise at least the paired radio performance information and valid location related information;

wherein the user plane data are the data that mobile devices transmit to retrieve location related information; the user plane data are firstly transmitted by the mobile device and then retrieved from at least one of the following: network elements and probes; and wherein, in step (C), the valid location related information is paired with a corresponding radio performance information based on a session information and a time information; the session information is used to pair the user plane data with correspondent control plane data, and the time information is used to pair the valid location related information with corresponding radio performance information.

2. The method for network based wireless network test according to claim 1, wherein the mobile device transmits to retrieve location related information under one of the following circumstances: i) the mobile device transmits a latitudinal and longitudinal information obtained by using a GPS module built-in the mobile device to the wireless network in order to retrieve location related information according to the latitudinal and longitudinal information; ii) the mobile device transmits a request to the wireless network in order to retrieve the location related information according to a current location of that mobile device; and iii) the mobile device connects to a nearby WiFi station by using a WiFi module built-in the mobile device and transmits the WiFi station's location related information to the wireless network, wherein the location related information of that mobile device is associated with the WiFi station's location related information.

3. The method for network based wireless network test according to claim 1, wherein the control plane data are logs of messages exchanged between mobile devices and wireless network to maintain the connection and service; said logs of messages are obtained from either event logs or call trace logs; the control plane data are retrieved from at least one of the following: network elements and probes.

4. The method for network based wireless network test according to claim 1, wherein a step (B1) is performed between the step (B) and the step (C);
step (B1): validating the parsed control plane data and the parsed user plane data in order to check whether the parsed control plane data have correspondent parsed user plane data and vice versa.

5. The method for network based wireless network test according to claim 4, wherein the step (B1) further checks whether the obtained location related information is within a right area by comparing whether the obtained location related information falls within the area served by the network elements or probes which the wireless network test apparatus retrieved the user plane data from; wherein, if the result of comparison is "YES", then the obtained location related information is the valid location related information; if the result of comparison is "NO", then the obtained location related information is discarded.

6. The method for network based wireless network test according to claim 1, wherein, the time information is used to pair the valid location related information with corresponding radio performance information by applying a fuzzy temporal scan; the fuzzy temporal scan comprises the following procedures:
determining a first time T1 when is the time that the valid location related information is captured by either the network elements or probes; and
scanning the radio performance information to see if any radio performance information is found within a time interval ranged between (T1−Tt) to (T1+Tt) while Tt is a defined threshold; if one radio performance information is found within the time interval, then the found radio performance information is associated with the valid location information; if more than one radio performance information are found within the time interval, then the radio performance information with a found time closest to the first time T1 is associated with the valid location information; if no radio performance information is found within the time interval, then the valid location information is discarded.

7. The method for network based wireless network test according to claim 1, wherein, in the step (D), the wireless network test apparatus generates the merged results in a form alike conventional drive test results.

8. The method for network based wireless network test according to claim 1, wherein said wireless network comply with at least one of the following communication protocols: GSM, GPRS, EDGE, CDMA2000, EVDO, UMTS, HSPA, WiMax, LTE, and LTE-A.

9. An apparatus for network based wireless network test, said apparatus is connected to a wireless network system that comprises a wireless network capable of providing communication services to a plurality of mobile devices, said apparatus comprising:
a control plane data retriever for retrieving control plane data, the control plane data including a plurality of radio performance information regarding to radio performances of connections when at least some of the mobile devices connect to the wireless network;
a user plane data retriever for retrieving user plane data; the user plane data including a plurality of location related information regarding to locations of at least some of the mobile devices when these mobile devices connect to the wireless network;
a control plane data parser for parsing the control plane data in order to obtain the radio performance information from the control plane data;
a user plane data parser for parsing the user plane data in order to obtain the location related information from the user plane data, said location related information including a plurality of valid location related information;
a parsed data validate and merger for at least merging the radio performance information with the location related information in such a manner that each of the valid location related information is paired with a correspondent radio performance information that is regarding to the same mobile device; and
a results generator for generating merged results that comprise at least the paired radio performance information and valid location related information;
wherein the user plane data are the data that mobile devices transmit to retrieve location related information; the user plane data are firstly transmitted by the mobile device and then retrieved from at least one of the following: network elements and probes; and
wherein the parsed data validate and merger pairs the valid location related information with a corresponding radio performance information based on a session information and a time information; the session information is used to pair the user plane data with correspondent control plane data, and the time information is used to pair the valid location related information with corresponding radio performance information.

10. The apparatus for network based wireless network test according to claim 9, wherein the mobile device transmits to retrieve location related information under one of the following circumstances: i) the mobile device transmits a latitudinal and longitudinal information obtained by using a GPS module built-in the mobile device to the wireless network in order to retrieve location related information according to the latitudinal and longitudinal information; ii) the mobile device transmits a request to the wireless network in order to retrieve the location related information according to a current location of that mobile device; and iii) the mobile device connects to a nearby WiFi station by using a WiFi module built-in the mobile device and transmits the WiFi station's location related information to the wireless network, wherein the location related information of that mobile device is associated with the WiFi station's location related information.

11. The apparatus for network based wireless network test according to claim 9, wherein the control plane data are logs of messages exchanged between mobile devices and wireless network to maintain the connection and service; said logs of messages are obtained from either event logs or call trace logs; the control plane data are retrieved from at least one of the following: network elements and probes.

12. The apparatus for network based wireless network test according to claim 9, wherein the parsed data validate and merger further validates the parsed control plane data and the parsed user plane data in order to check whether the parsed control plane data have correspondent parsed user plane data and vice versa.

13. The apparatus for network based wireless network test according to claim 12, wherein the parsed data validate and merger further checks whether the obtained location related information is within a right area by comparing whether the obtained location related information falls within the area served by the network elements or probes which the wireless network test apparatus retrieved the user plane data from; wherein, if the result of comparison is "YES", then the obtained location related information is the valid location related information; if the result of comparison is "NO", then the obtained location related information is discarded.

14. The apparatus for network based wireless network test according to claim 9, wherein, the time information is used to pair the valid location related information with corresponding radio performance information by applying a fuzzy temporal scan; the fuzzy temporal scan comprises the following procedures:

determining a first time T1 when is the time that the valid location related information is captured by either the network elements or probes; and scanning the radio performance information to see if any radio performance information is found within a time interval ranged between (T1−Tt) to (T1+Tt) while Tt is a defined threshold; if one radio performance information is found within the time interval, then the found radio performance information is associated with the valid location information; if more than one radio performance information are found within the time interval, then the radio performance information with a found time closest to the first time T1 is associated with the valid location information; if no radio performance information is found within the time interval, then the valid location information is discarded.

15. The apparatus for network based wireless network test according to claim 9, wherein, the results generator generates the merged results in a form alike conventional drive test results.

16. The apparatus for network based wireless network test according to claim 9, wherein said wireless network comply with at least one of the following communication protocols: GSM, GPRS, EDGE, CDMA2000, EVDO, UMTS, HSPA, WiMax, LTE, and LTE-A.

* * * * *